United States Patent
Pai et al.

(10) Patent No.: US 6,947,300 B2
(45) Date of Patent: Sep. 20, 2005

(54) PARALLEL DC-TO-AC POWER INVERTER SYSTEM WITH CURRENT SHARING TECHNIQUE AND METHOD THEREOF

(75) Inventors: Fu-Sheng Pai, Tainan (TW); Hung-Chieh Lin, Tainan (TW); Yuan-Fuan Lai, Tainan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/278,379

(22) Filed: Oct. 23, 2002

(65) Prior Publication Data

US 2003/0117816 A1 Jun. 26, 2003

(30) Foreign Application Priority Data

Oct. 23, 2001 (TW) .......................... 90126202 A (51) Int. Cl.$^7$ .............................................. H02M 7/00
(52) U.S. Cl. .............................. 363/65; 363/71; 363/97
(58) Field of Search ............................ 363/65, 67, 69, 363/70, 71, 72, 97

(56) References Cited

U.S. PATENT DOCUMENTS

| | | | |
|---|---|---|---|
| 5,477,132 A | * | 12/1995 | Canter et al. ............... 323/282 |
| 5,610,452 A | * | 3/1997 | Shimer et al. ............... 307/89 |
| 6,381,157 B2 | * | 4/2002 | Jensen ......................... 363/71 |

* cited by examiner

Primary Examiner—Jessica Han
(74) Attorney, Agent, or Firm—Volpe and Koenig, P.C.

(57) ABSTRACT

A parallel DC-to-AC power inverter system is provided. The parallel DC-to-AC power inverter system has a first DC-to-AC power inverter electrically connected in parallel with a second DC-to-AC power inverter, and each of the DC-to-AC power inverters includes an input port, an output port, a switching circuit electrically connected between the input port and the output port responsive to inverter control signals to convert a DC voltage at the input port to a first AC output voltage, an inductor-capacitor filter electrically connected to the switching circuit for filtering the first AC output voltage to an AC output voltage at output port, and a controller module for detecting an inductor current at the inductor-capacitor filter to generate an AC inductor current signal, for detecting the AC output voltage at the output terminals and transforming the AC output voltage to generate a first AC reference current signal, for detecting a load current at output port to generate an AC load current signal, for generating a second AC reference current signal by adding the first AC reference current signal to the AC load current signal, for performing a numerical operation of the second AC reference current signal of the first DC-to-AC power inverter and the second AC reference current signal of the second DC-to-AC power inverter to generate an AC reference current signal, and for generating the inverter control signals responsive to the AC reference current signal and the AC inductor current signal by sensing the inductor current at the inductor-capacitor filter. The related methods are also discussed.

12 Claims, 5 Drawing Sheets

PARALLEL DC-TO-AC POWER INVERTER SYSTEM WITH CURRENT SHARING TECHNIQUE AND METHOD THEREOF

FIELD OF THE INVENTION

The present invention relates to a parallel DC-to-AC power inverter system, and especially to a parallel DC-to-AC power inverter system with current sharing technique applied to an uninterruptible power supply system.

BACKGROUND OF THE INVENTION

Figure 1:
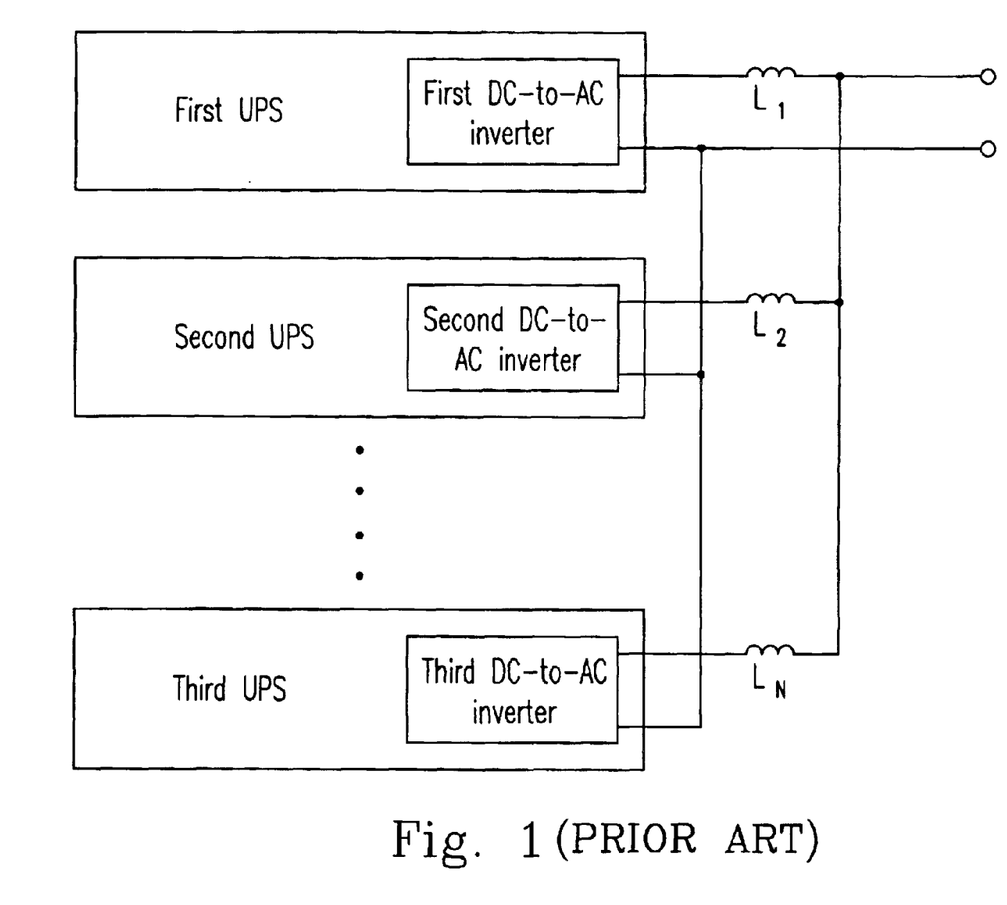
FIG. 1 illustrates a parallel operation of an uninterruptible power supply system according to the prior art.

Under certain circumstances, it can be desirable to provide a plurality of power supplies connected in parallel so as to have a common output node for supplying power to a load. If each power supply were to operate independently, however, a disproportionate amount of the current required by the load would tend to be supplied by only one power supply while the other power supplies would supply significantly less current. FIG. 1 shows a parallel operation of an uninterruptible power supply system according to the prior art. Please refer to FIG. 1. A typical parallel operation of an uninterruptible power supply (UPS) system must use a set of parallel-linking inductors $L_1$, $L_2$, ..., $L_n$ connected in parallel so as to stabilize the output voltage thereof In order to stabilize the output voltage of the system, it is necessary to utilize large inductors to stabilize the output voltage thereof. The technique has disadvantages in which the efficiency of the system is reduced, the volume of the system is increased, and the product cost is increased.

It is therefore attempted by the applicant to deal with the above situation encountered with the prior art.

SUMMARY OF THE INVENTION

It is therefore an object of the present invention to propose a direct parallel DC-to-AC power inverter system with current sharing technique and a load current feed-forward control technique without the use of parallel-linked inductors connected in parallel so as to stabilize the output voltage thereof.

According to an aspect of the present invention, a parallel DC-to-AC power inverter system has a first DC-to-AC power inverter electrically connected in parallel with a second DC-to-AC power inverter. Each of the DC-to-AC power inverters includes an input port, an output port, a switching circuit electrically connected between the input port and the output port responsive to inverter control signals to convert a DC voltage at the input port to a first AC output voltage, an inductor-capacitor filter electrically connected to the switching circuit for filtering the first AC output voltage to an AC output voltage at output port, and a controller module for detecting an inductor current at the inductor-capacitor filter to generate an AC inductor current signal, for detecting the AC output voltage at the output terminals and feeding the AC output voltage back to generate a first AC reference current signal, for detecting a load current at output port to generate an AC load current signal, for generating a second AC reference current signal by adding the first AC reference current signal to the AC load current signal, for performing a numerical operation of the second AC reference current signal of the first DC-to-AC power inverter and the second AC reference current signal of the second DC-to-AC power inverter to generate an AC reference current signal, and for generating the inverter control signals responsive to the AC reference current signal and the AC inductor current signal by sensing the inductor current at the inductor-capacitor filter.

Preferably, the controller module includes a current sensor electrically connected to the inductor-capacitor filter for detecting the inductor current at the inductor-capacitor filter to generate the AC inductor current signal, a current control circuit electrically connected to the output port for detecting the AC output voltage at the output port and transforming the AC output voltage to generate the first AC reference current signal, a load current sensor for detecting a load current at output port to generate the AC load current signal, a adder electrically connected to the current control circuit and the load current sensor for generating the second AC reference current signal by adding the first AC reference current signal to the AC load current signal, a current sharing circuit electrically connected to the adder of the first DC-to-AC power inverter and the adder of the second DC-to-AC power inverter for performing a numerical operation of the second AC reference current signal of the first DC-to-AC power inverter and the second AC reference current signal of the second DC-to-AC power inverter to generate the AC reference current signal, and a current mode control circuit electrically connected to the current sensor and the current sharing circuit for generating the inverter control signals.

Preferably, the current control circuit includes a voltage sensor coupled to the output port for sensing the AC output voltage to generate an output voltage signal, a subtractor received the output voltage signal and a reference voltage signal for generating an error voltage signal by subtracting the output voltage signal from the reference voltage signal, and a voltage controller coupled to the subtractor for transforming the error voltage signal to the first AC reference current signal.

Preferably, the numerical operation is an average operation.

It is therefore another aspect of the present invention to propose a parallel DC-to-AC power inverter system having a first DC-to-AC power inverter electrically connected in parallel with a second DC-to-AC power inverter. Each of the DC-to-AC power inverters includes an input port, an output port, a switching circuit which is electrically connected between the input port and the output port responsive to inverter control signals to convert a DC voltage at the input port to a first AC output voltage, an inductor-capacitor filter which is electrically connected to the switching circuit for filtering the first AC output voltage to an AC output voltage at output port, and a controller module for detecting an inductor current at the inductor-capacitor filter to generate an AC inductor current signal, for detecting the AC output voltage at the output port and transforming the AC output voltage to generate a first AC reference current signal, for performing a numerical operation of the first AC reference current signal of the first DC-to-AC power inverter and the first AC reference current signal of the second DC-to-AC power inverter to generate an AC reference current signal, and for generating the inverter control signals responsive to the AC reference current signal and the AC inductor current signal by sensing the inductor current at the inductor-capacitor filter.

Preferably, the controller module includes a current sensor electrically connected to the inductor-capacitor filter for detecting the inductor current at the inductor-capacitor filter to generate the AC inductor current signal, a current control circuit electrically connected to the output port for detecting the AC output voltage at the output port and transforming the AC output voltage to generate the first AC reference current signal, a current sharing circuit electrically connected to the current control circuit of the first DC-to-AC power and the current control circuit of the second DC-to-AC power for performing a numerical operation of the first AC reference current signal of the first DC-to-AC power inverter and the first AC reference current signal of the second DC-to-AC power inverter to generate the AC reference current signal, and a current mode control circuit electrically connected to the current sensor and the current sharing circuit for generating the inverter control signals.

Preferably, the numerical operation is an average operation.

Preferably, the current control circuit includes a voltage sensor coupled to the output port for sensing the AC output voltage to generate an output voltage signal, a subtractor received the output voltage signal and a reference voltage signal for generating an error voltage signal by subtracting the output voltage signal from the reference voltage signal, and a voltage controller coupled to the subtractor for transforming the error voltage signal to the first AC reference current signal.

It is therefore further aspect of the present invention to propose a control method for the parallel DC-to-AC power inverter system having a first DC-to-AC power inverter electrically connected in parallel with a second DC-to-AC power inverter, wherein each of the DC-to-AC power inverter comprises an input port, an output port, a switching circuit electrically connected between the input port and the output port responsive to inverter control signals to convert a DC voltage at the input port to a first AC output voltage, an inductor-capacitor filter electrically connected to the switching circuit for filtering the first AC output voltage to a AC output voltage at output port, including the steps of detecting an inductor current at the inductor-capacitor filter to generate an AC inductor current signal, detecting the AC output voltage at the output terminals and transforming the AC output voltage to generate a first AC reference current signal, detecting a load current at output port to generate an AC load current signal, generating a second AC reference current signal by adding the first AC reference current signal to the AC load current signal, performing a numerical operation of the second AC reference current signal of the first DC-to-AC power inverter and the second AC reference current signal of the second DC-to-AC power inverter to generate an AC reference current signal, and generating the inverter control signals responsive to the AC reference current signal and the AC inductor current signal by sensing the inductor current at the inductor-capacitor filter.

Preferably, the control method further includes the steps of sensing the AC output voltage to generate an output voltage signal, generating an error voltage signal by subtracting the output voltage signal from the reference voltage signal, and transforming the error voltage signal to the first AC reference current signal.

It is therefore more an aspect of the present invention to propose a control method for the direct parallel DC-to-AC power inverter system composed of a first DC-to-AC power inverter electrically connected in parallel with a second DC-to-AC power inverter, wherein each of the DC-to-AC power inverter includes an input port, an output port, a switching circuit which is electrically connected between the input port and the output port responsive to inverter control signals to convert a DC voltage at the input port to a first AC output voltage, an inductor-capacitor filter which is electrically connected to the switching circuit for filtering the first AC output voltage to a AC output voltage at output port, including the steps of detecting an inductor current at, the inductor-capacitor filter to generate an AC inductor current signal, detecting the AC output voltage at the output port and transforming the AC output voltage to generate a first AC reference current signal, performing a numerical operation of the first AC reference current signal of the first DC-to-AC power inverter and the first AC reference current signal of the second DC-to-AC power inverter to generate an AC reference current signal, and generating the inverter control signals which are responsive to the AC reference current signal and the AC inductor current signal by sensing the inductor current at the inductor-capacitor filter.

Preferably, the control method further includes the steps of sensing the AC output voltage to generate an output voltage signal, generating an error voltage signal by subtracting the output voltage signal from the reference voltage signal, and transforming the error voltage signal to the first AC reference current signal.

The present invention may best be understood through the following description with reference to the accompanying drawings, in which:

DETAILED DESCRIPTION OF THE PREFERRED EMBODIMENT

Figure 2:
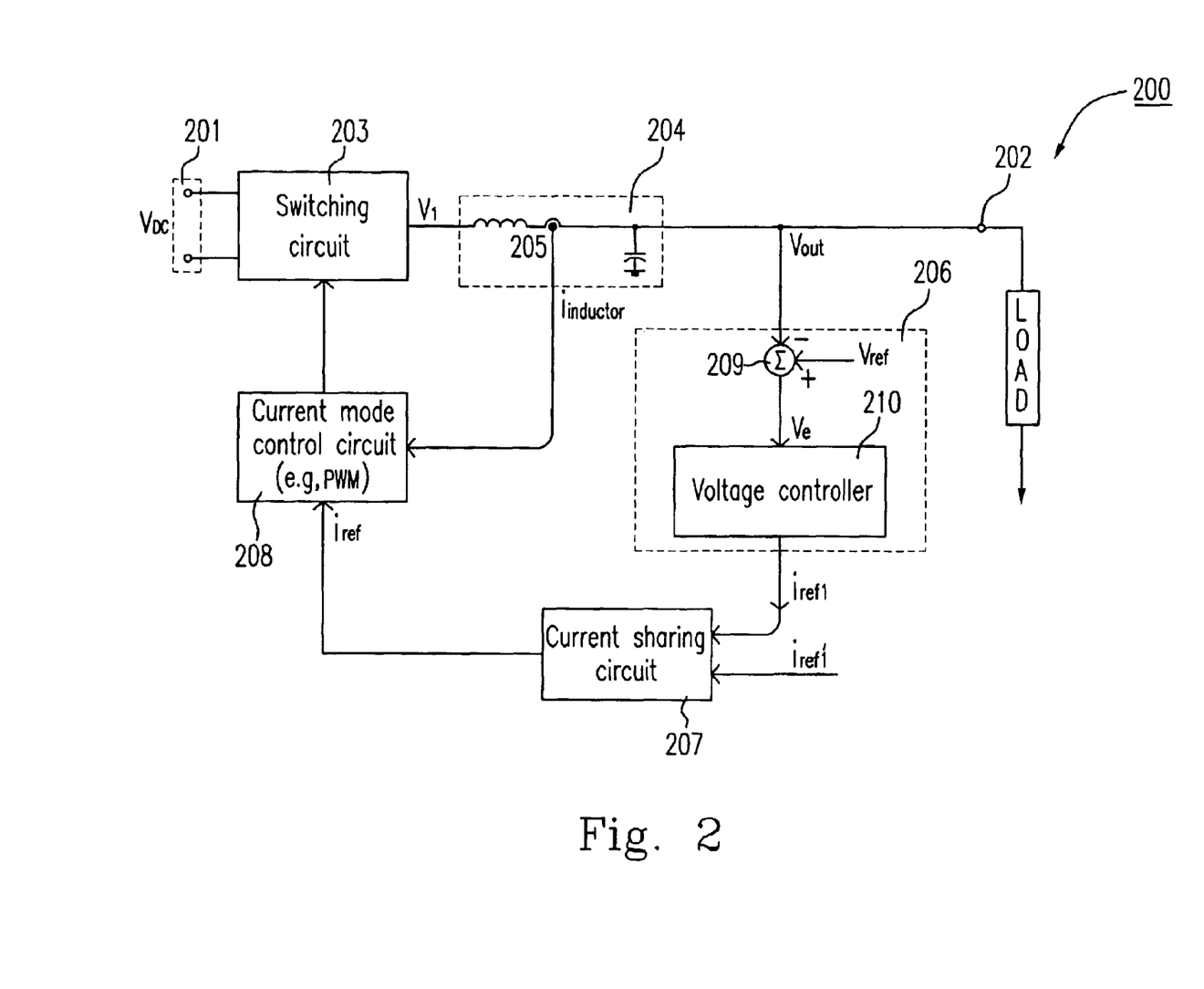
FIG. 2 illustrates a single DC-to-AC power inverter which utilizes a current sharing circuit according to a preferred embodiment of the present invention.

FIG. 2 illustrates a single DC-to-AC power inverter which utilizes a current sharing circuit according to a preferred embodiment of the present invention. As shown in FIG. 2, the DC-to-AC power inverter 200 includes an input port 201, an output port 202, a switching circuit 203, an inductor-capacitor filter 204, and a controller module. The switching circuit 203 is electrically connected between the input port 201 and the output port 202, which converts a DC voltage $V_{dc}$ at the input port 201 to a first AC output voltage $V_1$ responsive to inverter control signals. The inductor-capacitor filter 204 is electrically connected to the switching circuit 203 for filtering the first AC output voltage $V_1$ to an AC output voltage at output port 202. And, the controller module includes a current sensor 205, a current control circuit 206, a current sharing circuit 207, and a current mode control circuit 208. The current sensor is electrically connected to the inductor-capacitor filter 204 for detecting the inductor current at the inductor-capacitor filter 204 to generate the AC inductor current signal $i_{inductor}$. The current control circuit 206 is electrically connected to the output port 202 for detecting the AC output voltage $V_{out}$ at the output port 202 and transforming the AC output voltage to generate the first AC reference current signal $i_{ref1}$. The current sharing circuit 207 is electrically connected to the current control circuit 206 of a first DC-to-AC power and the current control circuit of a second DC-to-AC power for performing a numerical operation of the first AC reference current signal $i_{ref1}$ of the first DC-to-AC power inverter and the first AC reference current signal $i'_{ref1}$ of the second DC-to-AC power inverter to generate the AC reference current signal $i_{ref}$. And, the current mode control circuit 208 is electrically connected to the current sensor 205 and the current sharing circuit 207 for generating the inverter control signals. The inverter control signals are generated responsive to the AC reference current signal $i_{ref}$ and the AC inductor current signal $i_{inductor}$ by sensing the inductor current at the inductor-capacitor filter 204.

Meanwhile, the numerical operation is an average operation. In addition, the current control circuit 206 includes a voltage sensor, a subtractor 209, and a voltage controller 210. The voltage sensor is coupled to the output port 202 for sensing the AC output voltage to generate an output voltage signal $V_{out}$. The subtractor 209 receives the output voltage signal $V_{out}$ and a reference voltage signal $V_{ref}$ for generating an error voltage signal $V_e$ by subtracting the output voltage signal $V_{out}$ from the reference voltage signal $V_{ref}$. And, the voltage controller 210 is coupled to the subtractor 209 for transforming the error voltage signal $V_e$ to the first AC reference current signal $i_{ref1}$. Furthermore, the current control circuit 206 is here shown as including the subtractor 209 and the voltage controller 210 executing on a combination of a data processor (e.g., a microprocessor, digital signal processor (DSP), or combination thereof) and an associated memory.

Figure 3:
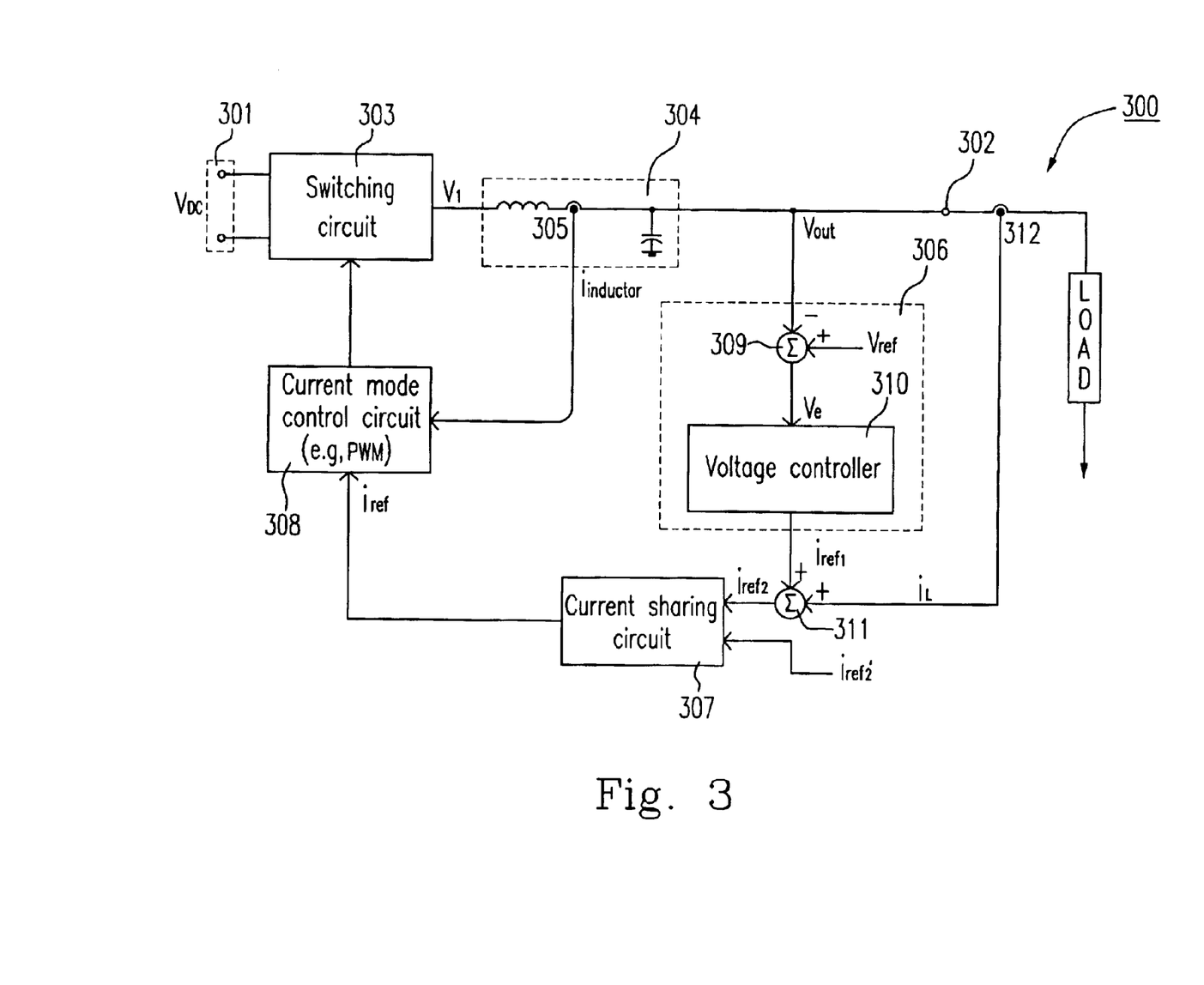
FIG. 3 illustrates a single DC-to-AC power inverter which utilizes a current sharing circuit according to another preferred embodiment of the present invention.

FIG. 3 illustrates a single DC-to-AC power inverter which utilizes a current sharing circuit according to another preferred embodiment of the present invention. As shown in FIG. 3, the DC-to-AC power inverter 300 includes an input port 301, an output port 302, a switching circuit 303, an inductor-capacitor filter 304, and a controller module. The switching circuit 303 which is electrically connected between the input port 301 and the output port 302 converts a DC voltage $V_{dc}$ at the input port 301 to a first AC output voltage $V_1$ responsive to inverter control signals. The inductor-capacitor filter 304 is electrically connected to the switching circuit 303 for filtering the first AC output voltage $V_1$ to an AC output voltage at the output port 302. And, the controller module includes a current sensor 305, a current control circuit 306, a load current sensor 312, an adder 311, a current sharing circuit 307, and a current mode control circuit 308.

Meanwhile, the current sensor 305 is electrically connected to the inductor-capacitor filter 304 for detecting the inductor current at the inductor-capacitor filter 304 to generate the AC inductor current signal $i_{inductor}$. The current control circuit 306 is electrically connected to the output port 302 for detecting the AC output voltage at the output port 302 and transforming the AC output voltage to generate the first AC reference current signal $i_{ref1}$. The load current sensor 312 senses a load current at the output port 302 to generate the AC load current signal $i_L$. The adder 311 is electrically connected to the current control circuit 306 and the load current sensor 312 for generating the second AC reference current signal $i_{ref2}$ by adding the first AC reference current signal $i_{ref1}$ to the AC load current signal $i_L$. The current sharing circuit 307 is electrically connected to the adder 311 of a first DC-to-AC power inverter and the adder of the second DC-to-AC power inverter for performing a numerical operation of the second AC reference current signal $i_{ref2}$ of the first DC-to-AC power inverter and the second AC reference current signal $i'_{ref2}$ of a second DC-to-AC power inverter to generate the AC reference current signal $i_{ref}$. And, the current mode control circuit 308 is electrically connected to the current sensor 305 and the current sharing circuit 307 for generating the inverter control signals. Hence, the inverter control signals are generated responsive to the AC reference current signal $i_{ref}$ and the AC inductor current signal $i_{inductor}$ by sensing the inductor current at the inductor-capacitor filter 304.

Moreover, the current control circuit includes a voltage sensor, a subtractor 309, and a voltage controller 310. The voltage sensor is coupled to the output port 303 for sensing the AC output voltage to generate an output voltage signal $V_{out}$. The subtractor 309 receives the output voltage signal $V_{out}$ and a reference voltage signal Vref for generating an error voltage signal $V_e$ by subtracting the output voltage signal $V_{out}$ from the reference voltage signal $V_{ref}$. And, the voltage controller 310 is coupled to the subtractor 309 for transforming the error voltage signal $V_e$ to the first AC reference current signal $i_{ref1}$. Meanwhile, the numerical operation is an average operation.

The major difference between FIG. 2 and FIG. 3 is that the AC load current signal $i_L$ sensed at the output port 302 is added to the first AC reference current signal $i_{ref1}$ to generate the second AC reference current signal $i_{ref2}$.

Figure 4A:
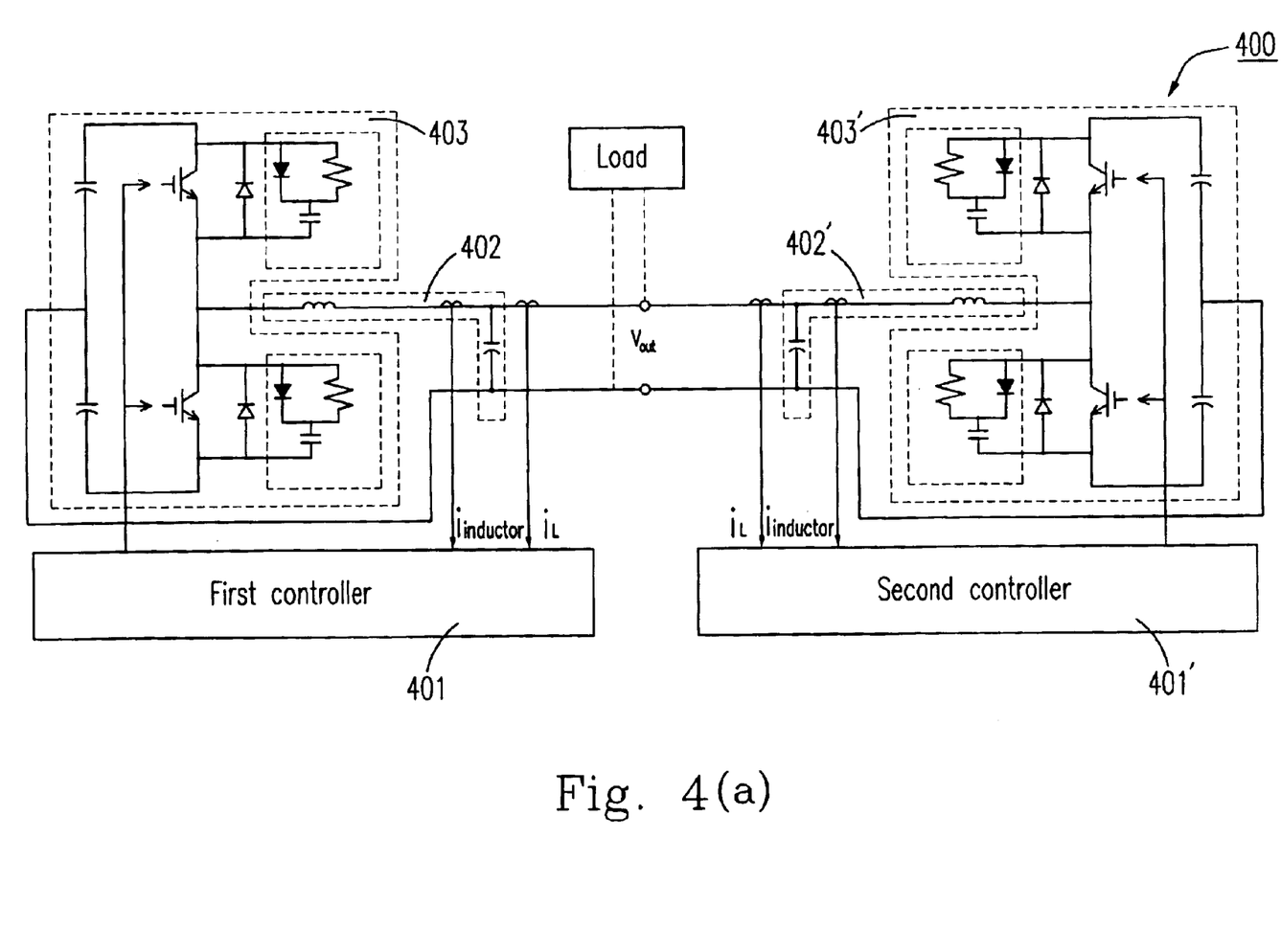
FIGS. 4(a)–(b) are schematic diagrams illustrating parallel DC-to-AC power inverter systems according to preferred embodiments of the present invention.
Figure 4B:
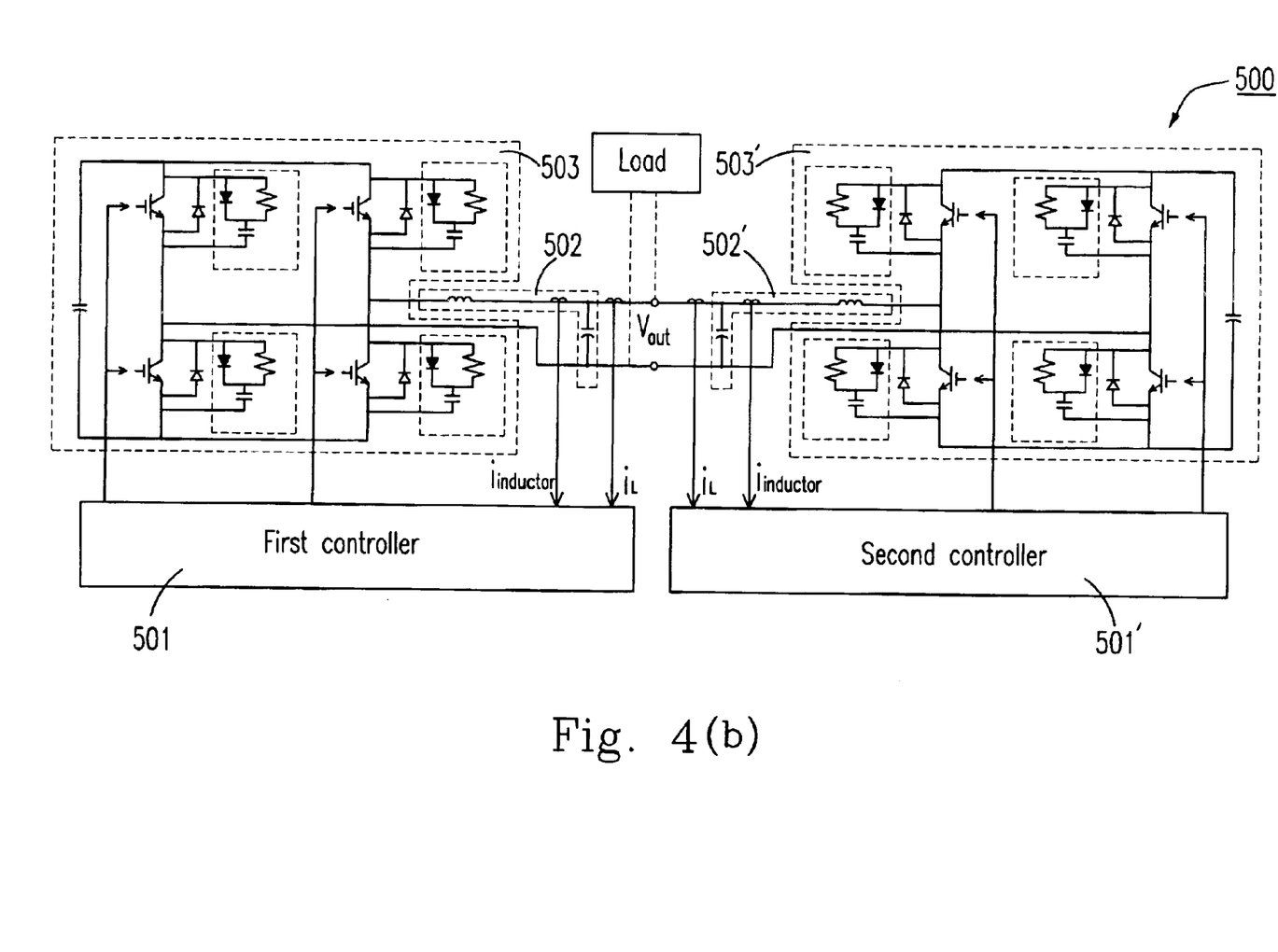

FIGS. 4(a)–(b) are schematic diagrams illustrating parallel DC-to-AC power inverter systems according to preferred embodiments of the present invention. The parallel DC-to-AC power inverter systems 400, 500 have a first DC-to-AC power inverters electrically direct connected in parallel with a second DC-to-AC power inverters. Each of the DC-to-AC power inverters is composed of controllers 401, 401', 501 or 501', switching circuits 403, 403', 503 or 503' and inductor-capacitor filters 402, 402', 502 or 502' respectively. Meanwhile, each controller includes a current sensor, a current control circuit, a load current sensor, an adder, a current sharing circuit, and a current mode control circuit.

Owing to the above descriptions, the present invention provides a parallel DC-to-AC power inverter system with current sharing technique and a load current feed-forward control technique without the use of inductors connected in parallel so as to stabilize the output voltage thereof. Therefore, the current sharing technique and the load current feed-forward control technique can be applied to two or more DC-to-AC power inverters connected in parallel.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A parallel DC-to-AC power inverter system having a first DC-to-AC power inverter electrically connected in parallel with a second DC-to-AC power inverter, each of said DC-to-AC power inverters comprising:

an input port;

an output port;

a switching circuit electrically connected between said input port and said output port responsive to inverter control signals to convert a DC voltage at said input port to a first AC output voltage;

an inductor-capacitor filter electrically connected to said switching circuit for filtering said first AC output voltage to an AC output voltage at output port; and a controller module for detecting an inductor current at said inductor-capacitor filter to generate an AC inductor current signal, for detecting said AC output voltage at said output terminals and transforming said AC output voltage to generate a first AC reference current signal, for detecting a load current at output port to generate an AC load current signal, for generating a second AC reference current signal by adding said first AC reference current signal to said AC load current signal, for performing a numerical operation of said second AC reference current signal of said first DC-to-AC power inverter and said second AC reference current signal of said second DC-to-AC power inverter to generate an AC reference current signal, and for generating said inverter control signals responsive to said AC reference current signal and said AC inductor current signal by sensing said inductor current at said inductor-capacitor filter.

2. The parallel DC-to-AC power inverter system according to claim 1, wherein said controller module comprises:

a current sensor electrically connected to said inductor-capacitor filter for detecting said inductor current at said inductor-capacitor filter to generate said AC inductor current signal;

a current control circuit electrically connected to said output port for detecting said AC output voltage at said output port and transforming said AC output voltage to generate said first AC reference current signal;

a load current sensor for detecting a load current at output port to generate said AC load current signal;

an adder electrically connected to said current control circuit and said load current sensor for generating said second AC reference current signal by adding said first AC reference current signal to said AC load current signal;

a current sharing circuit electrically connected to said adder of said first DC-to-AC power and said adder of said second DC-to-AC power for performing a numerical operation of said second AC reference current signal of said first DC-to-AC power inverter and said second AC reference current signal of said second DC-to-AC power inverter to generate said AC reference current signal; and a current mode control circuit electrically connected to said current sensor and said current sharing circuit for generating said inverter control signals.

3. The parallel DC-to-AC power inverter system according to claim 1, wherein said current control circuit comprises:

a voltage sensor coupled to said output port for sensing said AC output voltage to generate an output voltage signal;

a subtractor received said output voltage signal and a reference voltage signal for generating an error voltage signal by subtracting said output voltage signal from said reference voltage signal; and a voltage controller coupled to said subtractor for transforming said error voltage signal to said first AC reference current signal.

4. The parallel DC-to-AC power inverter system according to claim 1, wherein said numerical operation is an average operation.

5. A parallel DC-to-AC power inverter system having a first DC-to-AC power inverter electrically connected in parallel with a second DC-to-AC power inverter, each of said DC-to-AC power inverters comprising:

an input port;

an output port;

a switching circuit electrically connected between said input port and said output port responsive to inverter control signals to convert a DC voltage at said input port to a first AC output voltage;

an inductor-capacitor filter electrically connected to said switching circuit for filtering said first AC output voltage to an AC output voltage at output port; and a controller module for detecting an inductor current at said inductor-capacitor filter to generate an AC inductor current signal, for detecting said AC output voltage at said output port and transforming said AC output voltage to generate a first AC reference current signal, for performing a numerical operation of said first AC reference current signal of said first DC-to-AC power inverter and said first AC reference current signal of said second DC-to-AC power inverter to generate an AC reference current signal, and for generating said inverter control signals responsive to said AC reference current signal and said AC inductor current signal by sensing said inductor current at said inductor-capacitor filter.

6. The parallel DC-to-AC power inverter system according to claim 5, wherein said controller module comprises:

a current sensor electrically connected to said inductor-capacitor filter for detecting said inductor current at said inductor-capacitor filter to generate said AC inductor current signal;

a current control circuit electrically connected to said output port for detecting said AC output voltage at said output port and transforming said AC output voltage to generate said first AC reference current signal;

a current sharing circuit electrically connected to said current control circuit of said first DC-to-AC power inverter and said current control circuit of said second DC-to-AC power inverter for performing a numerical operation of said first AC reference current signal of said first DC-to-AC power inverter and said first AC reference current signal of said second DC-to-AC power inverter to generate said AC reference current signal; and a current mode control circuit electrically connected to said current sensor and said current sharing circuit for generating said inverter control signals.

7. The parallel DC-to-AC power inverter system according to claim 5, wherein said numerical operation is an average operation.

8. The parallel DC-to-AC power inverter system according to claim 5, wherein said current control circuit comprises:

a voltage sensor coupled to said output port for sensing said AC output voltage to generate an output voltage signal;

a subtractor received said output voltage signal and a reference voltage signal for generating an error voltage signal by subtracting said output voltage signal from said reference voltage signal; and a voltage controller coupled to said subtractor for transforming said error voltage signal to said first AC reference current signal.

9. A control method for the parallel DC-to-AC power inverter system having a first DC-to-AC power inverter electrically connected in parallel with a second DC-to-AC power inverter, wherein each of said DC-to-AC power inverter comprises an input port, an output port, a switching circuit electrically connected between said input port and said output port responsive to inverter control signals to convert a DC voltage at said input port to a first AC output voltage, an inductor-capacitor filter electrically connected to said switching circuit for filtering said first AC output voltage to a AC output voltage at output port, comprising the steps of:

detecting an inductor current at said inductor-capacitor filter to generate an AC inductor current signal;

detecting said AC output voltage at said output terminals and transforming said AC output voltage to generate a first AC reference current signal;

detecting a load current at output port to generate an AC load current signal;

generating a second AC reference current signal by adding said first AC reference current signal to said AC load current signal;

performing a numerical operation of said second AC reference current signal of said first DC-to-AC power inverter and said second AC reference current signal of said second DC-to-AC power inverter to generate an AC reference current signal; and     generating said inverter control signals responsive to said AC reference current signal and said AC inductor current signal by sensing said inductor current at said inductor-capacitor filter.

10. The control method according to claim 9, wherein the step of (b) comprises the steps of:

sensing said AC output voltage to generate an output voltage signal;

generating an error voltage signal by subtracting said output voltage signal from said reference voltage signal; and     transforming said error voltage signal to said first AC reference current signal.

11. A control method for the parallel DC-to-AC power inverter system having a first DC-to-AC power inverter electrically connected in parallel with a second DC-to-AC power inverter, wherein each of said DC-to-AC power inverter comprises an input port, an output port, a switching circuit electrically connected between said input port and said output port responsive to inverter control signals to convert a DC voltage at said input port to a first AC output voltage, an inductor-capacitor filter electrically connected to said switching circuit for filtering said first AC output voltage to a AC output voltage at output port, comprising the steps of:

detecting an inductor current at said inductor-capacitor filter to generate an AC inductor current signal;

detecting said AC output voltage at said output port and transforming said AC output voltage to generate a first AC reference current signal;

performing a numerical operation of said first AC reference current signal of said first DC-to-AC power inverter and said first AC reference current signal of said second DC-to-AC power inverter to generate an AC reference current signal; and     generating said inverter control signals responsive to said AC reference current signal and said AC inductor current signal by sensing said inductor current at said inductor-capacitor filter.

12. The control method according to claim 10, wherein the step of (b) comprises the steps of:

sensing said AC output voltage to generate an output voltage signal;

generating an error voltage signal by subtracting said output voltage signal from said reference voltage signal; and     transforming said error voltage signal to said first AC reference current signal.

\* \* \* \* \*